United States Patent [19]

Ramalingam et al.

[11] Patent Number: 4,751,129
[45] Date of Patent: Jun. 14, 1988

[54] ONE-PART HOT-SPRAYABLE EPOXY RESIN SYSTEMS AND METHODS

[75] Inventors: Balasubramaniam Ramalingam, Dublin; George W. Ritter, II, Granville; Mohan V. Kulkarni, Reynoldsburg, all of Ohio

[73] Assignee: Century Adhesives Inc., Columbus, Ohio

[21] Appl. No.: 85,744

[22] Filed: Aug. 10, 1987

[51] Int. Cl.$^4$ .......................... B05D 3/02; B32B 3/00; C08K 3/36; C08K 3/34
[52] U.S. Cl. .................................... 428/195; 427/386; 428/413; 523/457; 523/467
[58] Field of Search ................ 523/457, 467; 525/122; 428/195, 413; 427/386

[56] References Cited

U.S. PATENT DOCUMENTS

| | | | |
|---|---|---|---|
| 3,738,862 | 7/1973 | Klarquist et al. | 427/386 |
| 3,894,113 | 7/1975 | Pagel | 525/122 |
| 4,025,578 | 5/1977 | Siebert | 525/122 |
| 4,296,656 | 11/1981 | Mendelsohn | 525/122 |
| 4,320,047 | 3/1982 | Murphy et al. | 523/467 |
| 4,410,596 | 10/1983 | Whiteside et al. | 427/386 |
| 4,444,818 | 4/1984 | Tominaga et al. | 428/251 |
| 4,482,660 | 11/1984 | Minamisawa et al. | 523/467 |

*Primary Examiner*—Lewis T. Jacobs
*Attorney, Agent, or Firm*—Carroll F. Palmer

[57] ABSTRACT

A one-part composition for application to a substrate, e.g., automotive metal body panels, to provide reinforcement thereto is a thixotropic admixture containing as essential components (a) a heat curable epoxy resin system including the reaction product in the presence of a catalyst of at least one epoxy resin with a carboxy terminated elastomer, (b) dicyandiamide, and (c) a plurality of inorganic particulate filler materials, at least one of which is capable of imparting thixotropic properties to the composition. The method of reinforcing the substrate involves spraying the one-part epoxy resin containing composition onto at least a portion thereof in a heated condition and thereafter curing the composition at a temperature higher than the spraying temperature. Resulting reinforced substrates have tenaciously adhered thereto on at least a portion of one surface thereof a thermoset layer formed by the hot spraying and then curing thereon of the thixotropic composition.

14 Claims, 1 Drawing Sheet

ONE-PART HOT-SPRAYABLE EPOXY RESIN SYSTEMS AND METHODS

BACKGROUND OF THE INVENTION

1. Field of the Invention

This invention relates to (a) new compositions for use in reinforcing thin metal panels and other substrates, (b) new methods for reinforcing such substrates, particularly substrates so structured or positioned as to render known methods unworkable for reinforcing them, and (c) new forms of reinforced substrates.

2. Description of the Prior Art

There are many situations where a need exits for reinforcing a structural member to permit thinner cross sections of material to be used or to provide increased localized strength to a constructed article. For example, in the case of automotive vehicles, various reinforcing methods have been developed and applied to steel panels that form body parts of the vehicle.

A variety of reinforcing methods exist. For example, corrugation or lamination of panels can be used. Also, strengthening members, e.g., struts, can be welded or attached by fasteners to the substrate. However, such methods may not be applicable in many situations, e.g., corrugation of automotive exterior body panels is unacceptable.

Another known class of reinforcement methods involves the attachment of a strengthening member or material by a cement or adhesive to the panel or other substrate. For example, reinforcing material has been adhesively bonded to the inside of body panels such as a roof, a fender, a hood, a trunk, a quarter panel or a door, all of which are relatively broad and have a flat form, but of thin cross section, so that such panels will have sufficient stiffness to withstand stress exerted thereon. Prior reinforcing methods of this type are disclosed in U.S. Pat. Nos. 4,369,608; 4,378,385; 4,444,818 and 4,569,880. The present invention concerns this general type of reinforcement technique which will be referred to herein as adhesive reinforcing systems.

Adhesive reinforcing systems and methods are extensively used in the construction of new vehicles or other items, but are also useable in the repair of damaged items (see U.S. Pat. No. 2,795,523).

Known adhesive reinforcing systems have utilized as components thereof metals, asphalt, rubber, epoxy resins, acrylic resins, phenolic resins, polyester resins and combinations or modifications thereof. Regardless of the components used, requirements of a good adhesive reinforcing system for a given substrate are:

1. Adhesion to the substrate at room temperature with no or minimum surface preparation.

2. Continued adhesion to the substrate under adverse conditions until a heating operation can be reached, if the system requires heating for its completion. For example, panels to be used in automotive applications before a heating operation may need to undergo chemical treatment.

3. Capacity for hardening or curing in a specific temperature and time range.

4. Capability of not slumping, sagging or loosing adhesion in any of these operations.

Prior adhesive reinforcing systems such as those referenced above contain a reinforcement material in an unhardened or semi-hardened sheet that may or may not contain an additional bead forming material or foaming material. Essentially, these systems comprise pasty, reactive resins with some support layer and, when bonded and heated, become an permanent part of the substrate. All such systems have several disadvantages in meeting the listed requirements. For example, pasty reinforcing materials containing a latent curing agent show a very high sensitivity to changing temperature and humidity. Resulting variation in tack affects their adhesion performance. This can be a costly problem in automobile plants where panels with the adhesive reinforcing system on assembly lines lose the adhesive system. Since the temperatures in a variety of assembly plants differ, the success of such adhesive reinforcing systems will be unpredictable. Futher, because of the very hig viscosity of components of such systems, the reinforcement of panels or other substrates that have inaccessible areas, e.g., corners and curvatures, can not be reinforced therewith. This might be solved by the use of systems comprising less viscous resin components, but then a new problem is created, namely, sagging or slumping of the system before hardening. The present invention provides a new adhesive reforcing systems that avoid these problems.

Part of the success of the present invention depends on the use of epoxy resins as a component of the new adhesive reinforcement systems. Epoxy resins have been known for several decades and are an established class of curable resins and they, as well as compositions containing them, are disclosed in numerous patents and publications, e.g., see U.S. Pat. Nos. 2,863,853; 2,890,2041; 2,890,196; 3,001,972 and 3,139,657 and German offenlegungsshrift No. 2923314. The present invention uses a one-part form of epoxy resin, i.e., a resin material to which a catalyst or hardening agent need not be added prior to application, in providing new and improved adhesive reinforcing systems.

OBJECTS

A principal object of the invention is the provision of new compositions for use in reinforcing thin metal panels and other substrates, new methods for reinforcing such substrates and new forms of reinforced substrates.

Further objects include the provision of:

1. New one-part, curable and sprayable compositions that may be applied in heated condition to substrates to impart thereto lightweight reinforcement to greatly increase their flexural strength.

2. Such compositions that may be applied using conventional spray or other application equipment.

3. Such compositions that exhibit no sagging or slumping during the hardening thereof after application of the reinforcement system to a substrate.

4. New adhesive reinforcement systems that may be applied to substrates of any shape or position, namely, those with corners and/or curvatures as well as those blocked by some other structure, e.g., the inner surface of outside panel of a multipanel vehicle door.

5. Such systems that may be applied to a substrate is a specific temperature range so as to mitigate problems arising from variations in ambient temperatures occurring in application plants, e.g., avoid loss of adhesion during the assembly operation.

6. Such systems that exhibit extremely low contraction after curing to minimize distortion of the substrate to which the system has been applied.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of one-part compositions for application to substrates to provide reinforcement thereto by spraying in a heated condition and thereafter cured at a temperature higher than the spraying temperature which are thixotropic admixtures that comprises (a) a heat curable epoxy resin system comprising the reaction product in the presence of a catalyst of at least one epoxy resin with a carboxy terminated elastomer, (b) dicyandiamide, and (c) a plurality of inorganic particulate filler materials at least one of which is capable of imparting thixotropic properties to the composition, with such particulate component constituting between about 5 to 45% by weight of the composition.

Preferred compositions of the invention comprise (a) a heat curable epoxy resin system comprising the reaction product in the presence of a catalyst of at least one epoxy resin with bisphenol A and a carboxy terminated acrylonitrile butadiene copolymer, (b) dicyandiamide, (c) a catalyst accelerator, and (d) a plurality of inorganic particulate filler materials selected from the group consisting of fibrous calcium silicate, mica; silica, alumina and hydrated alumina, with these components constituting the following approximate percentages by weight of the composition:

component a 40-70%
component b 1-3%
component c 0.1-2%
component d 25-45%.

In particularly useful compositions, component a is the reaction product of the following materials:
(1) a liquid bisphenol A type epoxy resin,
(2) a solid bisphenol A type epxoy resin,
(3) a carboxyterminated acrylonitrile butadiene copolymer,
(4) bisphenol A, and
(5) a triarylphosphine catalyst,
and such numbered materials constitute the following approximate percentages by weight of said component a:
material 1 60-80%
material 2 1-10%
material 3 5-30%
material 4 5-20%
material 5 0.0001-1%.

In particularly useful compositions, component d consists essentially of the following materials:
material A fibrous calcium silicate,
material B mica,
material C silica, and
material D hydrated alumina,
and such letter designated materials constitute the following approximate percentages by weight of the component d:
material A 45-65%
material B 20-40%
material C 5-20%
Material D 5-20%.

Advantageously, material A is wollastonite and material C is high surface to volume ratio fumed silica.

In addition to esential components, the new sprayable compositions may contain up to about 10% by weight of one or more of the following additional components:
(e) an epoxidized polyalklene glycol,
(f) a low molecular weight polyamide,
(g) an organophosphate soap,
(h) an aminoalkyltrialkyloxy silane,
(i) a polyetherdiamine urea adduct,
(j) an epoxy resin.

The objects are further accomplished by the provision of new methods of reinforcing a web which comprises spraying a one-part, thixotropic, epoxy resin containing composition as described above onto at least a portion of the web in a heated condition and thereafter curing such composition at a temperature higher than the spraying temperature. In preferred methods, the spraying temperature is about 150° to 200° F. and the curing temperature is about 250° F. or higher, e.g., 250° to 400° F.

The objects are also accomplished, in part, by the provision of reinforced webs having tenaciously adhered thereto on at least a portion of one surface thereof a thermoset layer formed by hot spraying and then curing thereon a thixotropic admixture having the composition discussed above. In preferred embodiments, the substrate of the reinforced web is sheet material that comprises a part of a larger structure, e.g., such sheet material is sheet metal and such larger structure is a motor vehicle.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
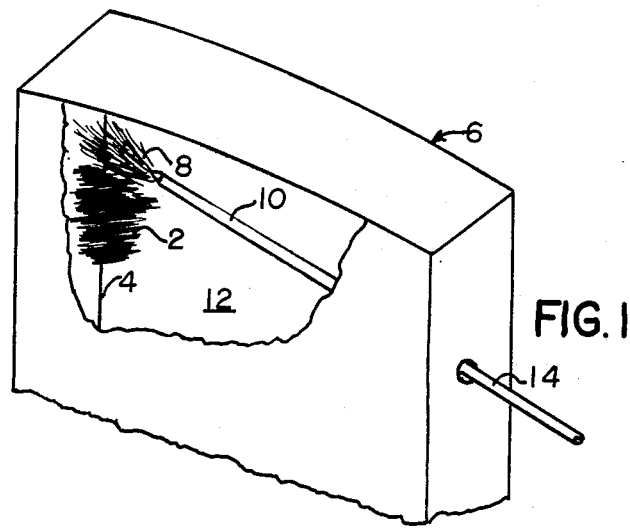
FIG. 1 is an isometric, partially fragmented view of the application in accordance with the invention of an adhesive reinforcing system to the interior surface of enclosed structure.

Referring in detail to the drawings, in which identical parts are identically marked, the invention makes possible the application of an adhesive reinforcing system 2 to the corner portion 4 of a rectangular shaped structure 6 by the spraying of a heated composition 8 by the spray wand 10 extended into the interior 12 of the structure 6 via the access hole 14. As can be seem from this illustration, the present invention makes it possible to provide even inner surfaces of preformed structures with adhesive reinforcing systems, a feat denied to reinforcing systems disclosed in the U.S. patents cited above. Following the spraying of the composition 8 heated, for example to a temperature of 180° F., the system layer 2 will be cured by heating the layer 2, either directly, e.g., by application of infrared light thereon, or indirectly, e.g., by heating the entire structure 6, to a temperature above the spraying temperature, e.g., 250° F. or higher.

Figure 2:
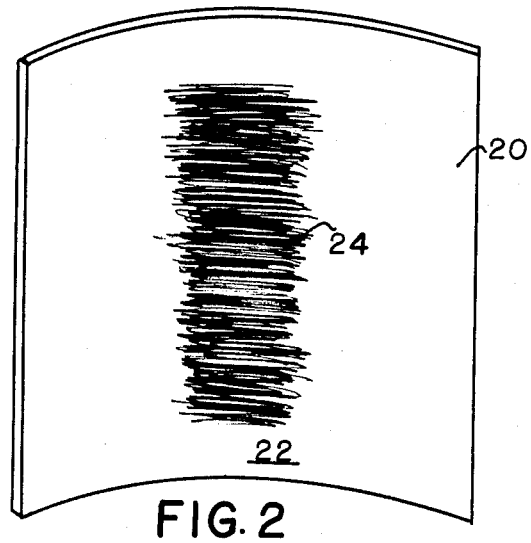
FIG. 2 is a plan view of a curved panel of sheet metal to which has been applied an adhesive reinforcing system in accordance with the invention.
Figure 3:
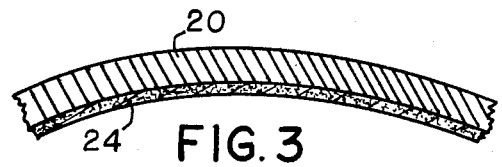
FIG. 3 is an enlarged, sectional view of a section of the panel of FIG. 2 bearing the adhesive reinforcing system of the invention.

In FIGS. 2 & 3, the curved sheet 20 of steel metal has the central area 22 thereof reinforced by a layer 24 of cured epoxy resin containing composition formulated in accordance with the invention.

The success of the present invention is due, in part, to the unique combination of commercially available raw materials to produce carefully designed resin systems that possess a balance of adhesion, viscosity and strength properties. As such, material specified herein by tradenames may be assumed to be interchangeable with generically equivalent materials or those bearing the same Chemical Abstract Service registry numbers and having equivalent properties to the recited material. Hence, the generic substitution of materials falls within the scope of the invention.

In the following working examples of compositions of the invention, all parts and percentages are by weight.

EXAMPLE 1

A propeller-stirrer type reaction vessel was charged with 64.3 parts of "Epon 828" resin, 4.3 parts of "Epon 1007" resin, 17.1 parts of "Hycar CTBN 1300×13" copolymer, 14.3 parts of bisphenol A and 0.013 parts of triphenylphosphine catalyst. Then while slow stirring of the admixture continued, the vessel and its contents were heated to 150° C. for one hour to produce a heat curable epoxy resin system comprising the reaction product of the "Epon" epoxy resins with the "Hycar" carboxy terminated copolymer.

EXAMPLE 2

A Sigma mixer was charged with 50 parts of the resin system of Example 1, 10 parts of "Epon 828" resin, 3 parts of dicyandiamide, 1 part of N,N-dimethyl-diphenyl urea, 1 part of "Bud-2000" urea adduct (Texaco Chemical Co.), 15 parts of wollastonite (W20 grade), 15 parts of mica 3× flakes, 3 parts of "CS-1361" organophosphate (Witco Chemical Co.) and 1 part "A-1100" silane (Monsanto Chemical Co.). After through mixing of the components, the resulting viscous composition was extruded from the mixer.

EXAMPLE 3

A quantity of the composition of Example 2 was charged into spray equipment capable of heating the material to be sprayed therewith. With the composition heated to a temperature of about 180° F., it was sprayed onto a 30 mil thick steel panel so as to coat one side thereof with a layer of the composition having a relatively uniform thickness of about 60 mils. The composition was easily applied to the panel from the spray gun and exhibited no running or sagging during the application.

When the spraying operation was completed, the coated panel was placed in an oven and heated at a temperature of about 350° F. for 30 minutes to effect a complete cure of the sprayed reinforcing resinous layer. During such curing operation, no sagging, slumping or loss of adhesion of the layer to the metal panel occurred.

At the completion of the curing operation, the reinforced metal panel was cooled and subsequently subjected to flexibility and other physical property tests which showed such reinforced panel to have greatly improved flex strength and other improved properties as compared to the untreated panels. Further, during the testing and other handling, no separation of the resinous layer from the metal panel occurred nor was there any indication of a possibility of this happening.

EXAMPLE 4

The procedure of Example 1 was repeated using the following components in the parts stated:

| "Epon 828" epoxy resin | 71.8 |
| "Epon 1007" epoxy resin | 3.4 |
| "Hycar 1300X13" copolymer | 13.5 |
| bisphenol A | 11.4 |
| triphenylphosphine | 0.013. |

EXAMPLE 5

The procedure of Example 2 was repeated using the following components in the parts stated:

| Product of Example 4 | 58.35 |
| dicyandiamide | 1.50 |
| dimethyl phenyl urea | 0.70 |
| "BUD 2000" urea adduct | 6.54 |
| 3X mica | 18.10 |
| W20 wollastonite | 10.80 |
| "Cabosil TS-720" silica | 3.40 |
| "A1100" silane | 0.12 |
| "CS-1361" organophosphate | 0.45. |

In the foregoing examples "Epon 828" is a bisphenol A type liquid epoxy resin and "Epon 1007" is a solid bisphenol A type epoxy resin, both marketed by Shell Chemical Co. Numerous other useable epoxy resins are commercially available which may be selected as equivalent substitutes by those knowledgeable about this known class of material.

The "Hycar CTBN 1300×13" elastomer is a carboxy terminated (CT) acrylonitrile butadiene copolymer made by B.F. Goodrich Chemical Co. Numerous other useable carboxy terminated elastomers, including CT styrene/butadiene copolymers, CT styrene/isoprene copolymers, CT butylnitrile rubber, etc. are commercially available which may be selected as equivalent substitutes by those knowledgeable about this known class of material.

The "BUD-2000" product marketed by Texaco Co. is a polyether diamine urea adduct which acts as an accelerator for the curing catalyst, i.e., the dicyandiamide, and also as an impact modifier for the total composition. Other polyetherdiamine urea adducts may be used in its place in these new compositions.

The "A-1100" product marketed by Monsanto Chemical Co. is an aminoalkyltrialkyloxy silane used in the new compositions to assist the resins therein to couple to the particulate components. A variety of other silanes with similar properties are available and may be substituted for this particular silane.

The "CS-1361" product marketed by Witco Chemical Co. is an organophosphate soap used in the new compositions to assist in cutting through oil that may be present on the surface of sheet metal or other web to which the new reinforcing systems are applied. A variety of other soaps with similar properties are available and may be substituted for this particular soap.

The "Cabosil TS-720" product marketed by Cabot Corp. is a high surface to volume ratio fumed silica which serves in the new compositions as a thickener and a thixotrope. A variety of other silicas with similar properties are available, e.g., "Hysil T233" & "Hysil T600", and may be substituted for this particular fumed silica.

Wollastonite is a naturally occurring fibrous calcium silicate mineral used in the new compositions as a reinforcing filler. Various other silicate minerals with similar properties are available and may be substituted for this particular silicate.

Mica is a naturally occurring plate-like aluminosilicate mineral used in the new compositions as a reinforcing filler and hydated alumina, e.g., aluminum trihydrate, is a standard filler for resinous composition that is non-reinforcing.

An optional class of material for inclusion in the new compositions is low molecular weight polyamides such as "V15 Epon Curing Agent" and "V40 Epon Curing Agent" marketed by Shell Chemical Co. to serve as impact modifiers for the new adhesive reinforcing systems. Various other polyamides with similar properties are commercially available and may be substituted for these particular polyamides.

Another optional class of material for inclusion in the new compositions is epoxidized polyalkylene glycols, e.g., "DER-736" and "TV-720", epoxidized polyethylene glycols marketed by Dow Chemical Co., to serve as flexibilizers for the new adhesive reinforcing systems. Various other such glycols with similar properties are commercially available and may be subsituted for these particular glycols.

The foregoing specification discloses new sprayable, one part, adhesive reinforcing compositions that before and during spraying in heated condition, e.g., 180° to 200° F. are uncured, but which after spraying on a substrate may be cured at temperatures of 250° F. or higher to a fully hardened state. These compositions do not exhibit any sag when sprayed in thicknesses of up to two times or more the thickness of the substrate. Since they are sprayable, they may be used to reinforce substrates that have been impossible for such treatment by prior known systems because of their contour or blockage by adjacent structures.

The embodiments of the invention in which an exclusive property or privilege is claimed are defined as follows:

1. A one-part composition for application to a substrate to provide reinforcement thereto by spraying when heated to a first temperature above ambient and thereafter cured at a second temperature higher than said first temperature which is a thixotropic admixture comprising the following components:
   (a) a heat curable epoxy resin system comprising the reaction product of the following materials:
      (1) a liquid bisphenol A epoxy resin,
      (2) a solid bisphenol A epoxy resin,
      (3) a carboxyterminated acrylonitrile butadiene copolymer,
      (4) bisphenol A, and
      (5) a triarylphosphine catalyst,
   (b) dicyandiamide,
   (c) a catalyst accelerator, and
   (d) a mixture of the following inorganic particulate filler materials:
      (A) fibrous calcium silicate,
      (B) mica, and
      (C) fumed silica,
said components constituting the following approximate percentages by weight of said composition:
   component a 40–70%
   component b 1–3%
   component c 0.1–2%
   component d 25–45%.

2. The composition of claim 1 which contains up to about 10% by weight of one or more of the following additional components:
   (e) An epoxidized polyalklene glycol,
   (f) a low molecular weight polyamide,
   (g) an organophosphate soap,
   (h) an aminoalkyltrialalkloxy silane,
   (i) a polyetherdiamine urea adduct,
   (j) an epoxy resin.

3. The method of reinforcing a web which comprises spraying a one-part epoxy resin containing composition onto at least a portion thereof in a heated condition and thereafter curing said composition at a temperature higher than the spraying temperature, said composition being a thixotropic admixture comprising the following components:
   (a) a heat curable epoxy resin system comprising the reaction product in the presence of a catalyst of at least one epxoxy resin with a carboxy terminated elastomer,
   (b) dicyandiamide, and
   (c) a plurality of inorganic particulate filler materials at least one of which is capable of imparting thixotropic properties to said composition.

4. The method of reinforcing a web which comprises spraying a one-part epoxy resin containing composition onto at least a portion thereof in a heated condition and thereafter curing said composition at a temperature higher than the spraying temperature, said composition being a thixotropic admixture comprising the following components:
   (a) a heat curable epoxy resin system comprising the reaction product of the following materials:
      (1) a liquid bisphenol A epoxy resin,
      (2) a solid bisphenol A epoxy resin,
      (3) a carboxyterminated acrylonitrile butadiene copolymer,
      (4) bisphenol A, and
      (5) a triarylphosphine catalyst.
   (b) dicyandiamide,
   (c) a catalyst accelerator, and
   (d) a mixture of the following inorganic particulate filler materials:
      (A) fibrous calcium silicate,
      (B) mica, and
      (C) fumed silica.
      (D) hydrated alumina
said components constituting the following approximate percentages by weight of said composition:
   component a 40–70%
   component b 1–3%
   component c 0.1–2%
   component d 25–45%

5. The method of claim 3 wherein said web is sheet material comprising a portion of a larger structure.

6. The method of claim 5 wherein said sheet material is sheet metal and said larger structure is a motor vehicle.

7. A reinforced web having adhered thereto on at least a portion of one surface thereof a thermoset layer formed by hot spraying and then curing thereon a thixotropic admixture comprising the following components:
   (a) a heat curable epoxy resin system comprising the reaction product in the presence of a catalyst of at least one epoxy resin with a carboxy terminated elastomer,
   (b) dicyandiamide, and (c) a plurality of inorganic particulate filler materials at least one of which is capable of imparting thixotropic properties to said composition.

8. The article of claim 7 wherein said web is a section of sheet material.

9. The article of claim 8 wherein said sheet material comprises a part of a larger structure.

10. The article of claim 9 wherein said sheet material is sheet material and said larger structure is a motor vehicle.

11. A reinforced web having adhered thereto on at least a portion of one surface thereof a thermoset layer formed by hot spraying and then curing thereon a thixotropic admixture comprising the following components:
   (a) a heat curable epoxy resin system comprising the reaction product of the following materials:
      (1) a liquid bisphenol A epoxy resin,
      (2) a solid bisphenol A epoxy resin,
      (3) a carboxyterminated acrylonitrile butadiene copolymer,
      (4) bisphenol A, and
      (5) a triarylphosphine catalyst.
   (b) dicyandiamide,
   (c) a catalyst accelerator, and
   (d) a mixture of the following inorganic particulate filler materials:
      (A) fibrous calcium silicate,
      (B) mica, and
      (C) fumed silica.

said components constituting the following approximate percentages by weight of said composition:
   component a 40–70%
   component b 1–3%
   component c 0.1–2%
   component d 25–45%.

12. The article of claim 11 wherein said web is a section of sheet material.

13. The article of claim 12 wherein said sheet material comprises a part of a larger structure.

14. The article of claim 13 wherein said sheet material is sheet material and said larger structure is a motor vehicle.

* * * * *